United States Patent
Ebner et al.

(10) Patent No.: US 12,512,490 B2
(45) Date of Patent: Dec. 30, 2025

(54) CROSS-CELL LEAK DETECTION AND SAMPLE CONDITIONING SYSTEM

(71) Applicant: ELECTRIC HYDROGEN CO., Devens, MA (US)

(72) Inventors: Curt C. Ebner, Redwood City, CA (US); Matthew C. Tabor, Denver, CO (US)

(73) Assignee: Electric Hydrogen Co., Devens, MA (US)

( * ) Notice: Subject to any disclaimer, the term of this patent is extended or adjusted under 35 U.S.C. 154(b) by 0 days.

(21) Appl. No.: 18/996,740

(22) PCT Filed: Jul. 29, 2024

(86) PCT No.: PCT/US2024/039986
§ 371 (c)(1),
(2) Date: Jan. 17, 2025

(87) PCT Pub. No.: WO2025/029712
PCT Pub. Date: Feb. 6, 2025

(65) Prior Publication Data
US 2025/0260027 A1    Aug. 14, 2025

Related U.S. Application Data

(60) Provisional application No. 63/529,918, filed on Jul. 31, 2023.

(51) Int. Cl.
*H01M 8/04119* (2016.01)
*H01M 8/04014* (2016.01)
(Continued)

(52) U.S. Cl.
CPC ... *H01M 8/04089* (2013.01); *H01M 8/04014* (2013.01); *H01M 8/04746* (2013.01)

(58) Field of Classification Search
CPC ........ H01M 8/04089; H01M 8/04014; H01M 8/04746
(Continued)

(56) References Cited

U.S. PATENT DOCUMENTS

| | | | |
|---|---|---|---|
| 2003/0082417 A1* | 5/2003 | Lillis | H01M 8/04089 73/1.16 |
| 2010/0108535 A1 | 5/2010 | Baltrucki et al. | |
| 2014/0120442 A1 | 5/2014 | DiLeo et al. | |

FOREIGN PATENT DOCUMENTS

| | | |
|---|---|---|
| CN | 111595655 A | 8/2020 |
| JP | 2019196923 A * | 11/2019 |

OTHER PUBLICATIONS

Search Report and Written Opinion of the International Searching Authority for PCT/US2024/039986, mailed Oct. 24, 2024, pp. 1-8.

* cited by examiner

*Primary Examiner* — Christian Roldan
(74) *Attorney, Agent, or Firm* — Lempia Summerfield Katz LLC

(57) ABSTRACT

A system and method for detecting and conditioning cross-leaks in the operation of electrolysis systems includes a separator configured to separate the fluid into a first stream and a second stream; a heat exchanger configured to lower a temperature of the first stream to form a condensed liquid within the first stream via condensation; a trap system configured to drain the condensed liquid out of a lower outlet of the trap system and transfer a gas composition within the first stream out of an upper outlet of the trap system; a flow control and metering system configured to reduce a pressure of the first stream such that additional liquid is formed and removed from the first stream due to a pressure drop, therein (Continued)

providing a conditioned gas in the first stream; and a gas sensor configured to measure the conditioned gas in the first stream.

20 Claims, 6 Drawing Sheets

(51) Int. Cl.
 *H01M 8/04089* (2016.01)
 *H01M 8/04746* (2016.01)
(58) Field of Classification Search
 USPC .......................................................... 429/444
 See application file for complete search history.

CROSS-CELL LEAK DETECTION AND SAMPLE CONDITIONING SYSTEM

This application is a § 371 nationalization of PCT Application Serial No. PCT/US2024/039986, filed Jul. 29, 2024, designating the United States, which claims the benefit of U.S. Provisional Patent Application No. 63/529,918, filed Jul. 31, 2023, which are hereby incorporated by reference in their entireties.

FIELD

The following disclosure relates to electrochemical or electrolysis system and components thereof. More specifically, the following disclosure relates to a system and method for actively and continuously monitoring the electrochemical system for detection of cross-cell leak during operation of the electrochemical system.

BACKGROUND

An electrochemical or electrolysis cell or system uses electrical energy to drive a chemical reaction. For example, within a water splitting electrolysis reaction within the electrolysis cell, water is split to form hydrogen and oxygen. The products may be used as energy sources for later use. In recent years, improvements in operational efficiency have made electrolyzer systems competitive market solutions for energy storage, generation, and/or transport. For example, the cost of generation may be below $10 per kilogram of hydrogen in some cases. Increases in efficiency and/or improvements in operation will continue to drive installation of electrolyzer systems.

Detection of cross-cell leaks that create combustible levels of hydrogen in oxygen or oxygen in hydrogen is critical to the safe operation of electrolysis systems. Not only does cross-cell leakage decrease process efficiency, but it becomes a serious safety concern. Hydrogen has a Lower Explosive Limit (LEL) of just 4% volume, meaning even tiny quantities of hydrogen within an oxygen-rich product stream on the anode side of an electrochemical cell may cause an explosion. Even a spark of static electricity from a person's finger is enough to trigger an explosion when hydrogen is present.

Because hydrogen is odorless, colorless, and tasteless, hydrogen leak detection is extremely difficult without the help of mechanical sensors. Monitoring a gas stream for the presence of hydrogen gas in an oxygen gas stream or oxygen gas in a hydrogen gas stream, therefore, demands specialized equipment to alert personnel of danger and prompt emergency response procedures.

In certain examples, to detect the composition or combustibility of a gas stream, a small sample stream is constantly removed and passed by a gas sensor or gas measuring instrument. Most standard technologies of gas sensors require that the sample stream be below 60° C. and that the water vapor levels are non-condensing or below a relative humidity (RH) of 95%.

However, the sample gas stream from an electrolysis system may be at temperatures above 60° C. Additionally, the sample gas stream may be saturated with water and have greater than 95% relative humidity. As such, the gas sample stream requires conditioning before passing a gas sensor in order for the gas sensor to accurately measure the concentration of the gas sample. Current methods use an active liquid separator, which typically cannot be located on or near the source of the leak, an active cooling system, an active condensate removal system, and a reheating system to condition the sample stream before passing the stream by the gas sensor. Other filters and drying membranes may be used as well. Furthermore, the equipment required to do this is complex, expensive, prone to air dilution of the sample gas stream, and may block the inlet and outlet of the flow of the sample gas stream.

Thus, current systems and methods compromise, reduce, or remove the efficiency of detecting cross-cell leaks by gas sensors. As such, there remains a need to provide an improved detection and conditioning system for an electrochemical cell or system.

SUMMARY

In one embodiment, a gas detection and conditioning system includes a separator configured to receive a fluid from an outlet of an electrochemical stack. The separator is configured to separate the fluid into a first stream including a majority of a gas of the fluid and a second stream including a remaining composition of the fluid. The first stream is configured to flow out of an upper outlet of the separator and the second stream is configured to drain out of a lower outlet of the separator. The system also includes a heat exchanger configured to receive the first stream from the upper outlet of the separator and lower a temperature of the first stream to form a condensed liquid within the first stream via condensation. The system also includes a trap system configured to receive the first stream from the heat exchanger. The trap system is configured to drain the condensed liquid out of a lower outlet of the trap system and transfer a gas composition within the first stream out of an upper outlet of the trap system. The system also includes a flow control and metering system configured to receive the first stream including the gas composition from the trap system. The flow control and metering system includes a pressure regulator configured to reduce a pressure of the first stream such that additional liquid is formed and removed from the first stream due to a pressure drop, therein providing a conditioned gas in the first stream. Additionally, the system includes a gas sensor configured to measure the conditioned gas in the first stream received from the flow control and metering system as the conditioned gas is vented through a vent.

In another embodiment, a method for detecting and conditioning a gas of a stack of an electrochemical cell includes separating, by a separator of a gas detection and conditioning system, a fluid received from an outlet of an electrochemical stack into a first stream including a majority of a gas of the fluid and a second stream including remaining composition of the fluid. The method further includes transferring the first stream out of an upper outlet of the separator to a heat exchanger of the gas detection and conditioning system. The method also includes lowering, by the heat exchanger, a temperature of the first stream received from the separator to form a condensed liquid within the first stream via condensation. The method also includes draining, by a trap system of the gas detection and conditioning system, the condensed liquid received from the heat exchanger out of a lower outlet of the trap system. The method also includes transferring, by the trap system, a gas composition within the first stream received from the heat exchanger out of an upper outlet of the trap system to a flow control and metering system of the gas detection and conditioning system. The method also includes reducing, by a pressure regulator of the flow control and metering system, a pressure of the gas composition within the first stream such that additional liquid is formed and removed from the first stream due to a pressure drop, therein providing a conditioned gas in the first stream. Additionally, the method includes measuring, by a gas sensor of the gas detection and conditioning system, the conditioned gas in the first stream received from the flow control and metering system as the conditioned gas is vented through a vent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Exemplary embodiments are described herein with reference to the following drawings.

Figure 1A:
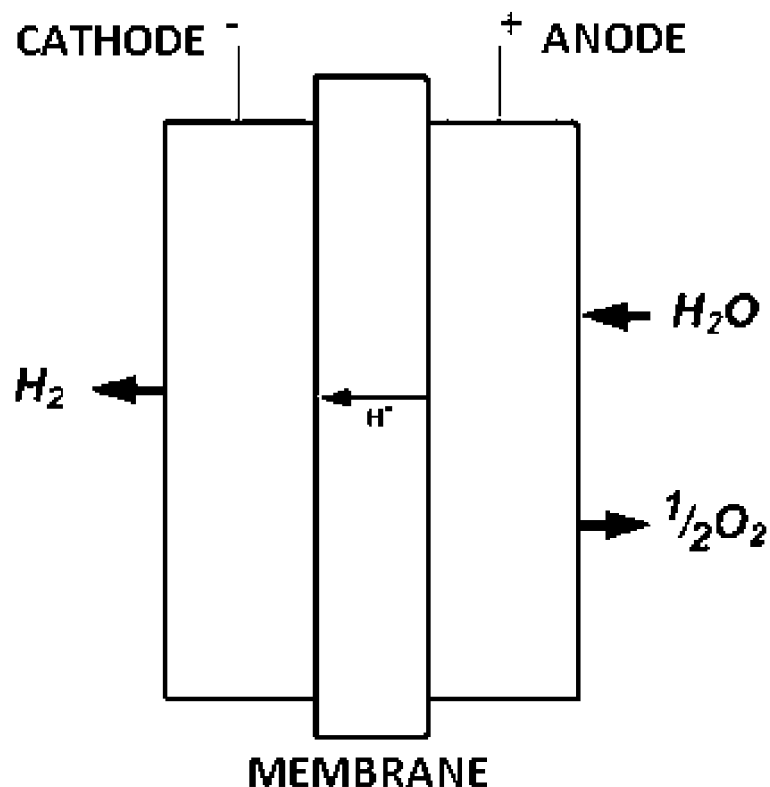
FIG. 1A depicts an example of an electrochemical or electrolytic cell.

While the disclosed compositions and methods are representative of embodiments in various forms, specific embodiments are illustrated in the drawings (and are hereafter described), with the understanding that the disclosure is intended to be illustrative and is not intended to limit the claim scope to the specific embodiments described and illustrated herein.

DETAILED DESCRIPTION

The following discussion relates to systems and methods for continuously conditioning a sample stream within an electrochemical system to monitor for any cross-leak in the operation of the electrochemical system. The disclosure advantageously describes a gas detecting and conditioning system that provides efficient detection of cross-leaks at an inexpensive cost. Additionally, the disclosure advantageously provides a less complex system with fewer parts, a system that is passively operated, limits the possibility of air dilution of a sample gas of a cross-leak, detects flow loss to a gas sensor, and frequently and accurately checks a sample gas of a cross-leak at a reduced equipment cost.

Furthermore, continuously conditioning and monitoring a sample stream within the electrochemical system advantageously provides for safer operation of electrochemical system. Examples of such systems and methods are described in greater detail below.

FIG. 1A depicts an example of an electrochemical cell for the production of hydrogen gas and oxygen gas through the splitting of water. The electrochemical cell includes a cathode, an anode, and a membrane positioned between the cathode and anode. Within the water-splitting electrolysis reaction, one interface runs an oxygen evolution reaction (OER) while the other interface runs a hydrogen evolution reaction (HER). For example, the anode reaction is $H_2O \rightarrow 2H^+ + \frac{1}{2}O_2 + 2e$ and the cathode reaction is $2H^+ + 2e \rightarrow H_2$. The water electrolysis reaction has recently assumed great importance and renewed attention as a potential foundation for a decarbonized "hydrogen economy."

Figure 1B:
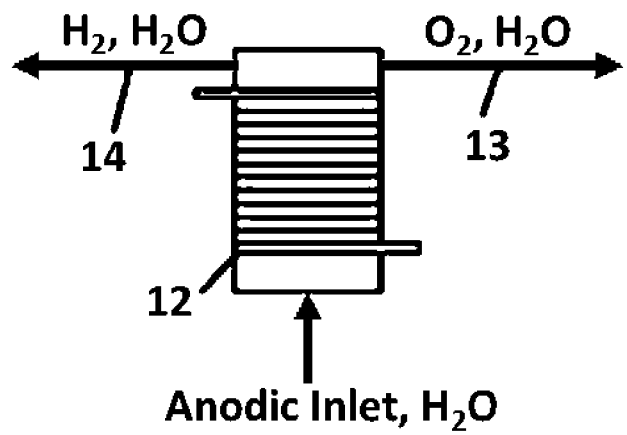
FIG. 1B depicts an example of a system including an electrochemical stack having a plurality of electrochemical cells of FIG. 1A.

FIG. 1B depicts an example of a system including an electrochemical stack having a plurality of electrochemical cells of FIG. 1A. In certain examples, the electrochemical stack may contain 50-1000 cells, 50-100 cells, 500-700 cells, or more than 1000 cells. Any number of cells may make up a stack. The electrochemical cells within the electrochemical stack may be configured to operate with 200 mV or less of pure resistive loss when operating at a high current density (e.g., at least 3 Amp/cm$^2$ at least 4 Amps/cm$^2$, at least 5 Amps/cm$^2$, at least 6 Amps/cm$^2$, at least 7 Amps/cm$^2$, at least 8 Amps/cm$^2$, at least 9 Amps/cm$^2$, at least 10 Amps/cm$^2$, or at least 11 Amps/cm$^2$, at least 12 Amps/cm$^2$, at least 13 Amps/cm$^2$, at least 14 Amps/cm$^2$, at least 15 Amps/cm$^2$, at least 16 Amps/cm$^2$, at least 17 Amps/cm$^2$, at least 18 Amps/cm$^2$, at least 19 Amps/cm$^2$, at least 20 Amps/cm$^2$, at least 25 Amps/cm$^2$, at least 30 Amps/cm$^2$, in a range of 1-30 Amps/cm$^2$, in a range of 3-20 Amps/cm$^2$, in a range of 3-15 Amps/cm$^2$, in a range of 3-10 Amps/cm$^2$, or in a range of 10-20 Amps/cm$^2$).

As illustrated in the system of FIG. 1B, water (H$_2$O) may be supplied to the anodic inlet of an electrolytic cell stack 12. In some embodiments, only the anodic inlet of the cell stack 12 may receive water. In these embodiments, the cathode side of the cell stack 12 may not receive water (e.g., a dry cathode side may be used). In another embodiment, a cathode inlet may also receive water, wherein the water may be supplied to the cathode inlet to cool the cell stack 12 during electrolysis.

The water supplied to the anodic inlet flows to an anodic inlet manifold that distributes the water to the anode side of the plurality of cells contained with the cell stack 12. In embodiments where water is supplied to the cathode inlet, water supplied to the cathode inlet flows to a cathodic inlet manifold that distributes the water to the cathode side of the plurality of cells in the cell stack 12. In certain examples, the amount of water (e.g., deionized (DI) water) transferred to or circulated through each cell of the stack may be in a range of 0.25-1 mL/Amp/cell/min, in a range of 0.25-5 mL/Amp/cell/min, or in a range of 0.5-1 mL/Amp/cell/min.

During electrolysis, oxygen (O$_2$) is produced at the anode side of the electrolytic cells and hydrogen (H$_2$) is produced at the cathode side of the electrolytic cells. Specifically, a water splitting electrolysis reaction is configured to take place within each individual cell in the cell stack 12. Each cell includes one interface (the anode side of the cell) configured to run an oxygen evolution reaction (OER) and another interface (the cathode side of the cell) configured to run a hydrogen evolution reaction (HER), such as depicted in FIG. 1A.

During electrolysis, some of the water supplied to the anode side of an electrolytic cell may not be converted into oxygen. Accordingly, a two-phase flow of oxygen and unreacted water is outlet from each of the anode sides of the cells into an anodic outlet manifold 13. The two-phase flow of oxygen and unreacted water flows from out of the cell stack 12 through the anodic outlet manifold 13. This stream within the anodic outlet manifold 13 may be configured to be transferred to a gas detection and conditioning system, such as described in greater detail below, for analysis of the composition within the stream. Specifically, this anodic stream may be analyzed to identify if any undesirable hydrogen gas has leaked (i.e., cross-leaked) across the membranes from the cathode sides of the cells to the anode sides of the cells within the cell stack.

Additionally, as noted above, in some embodiments, water may be supplied to the cathode side of the cell stack as a coolant. Accordingly, a two-phase flow of hydrogen and water is outlet from each of the cathode sides of the cells to a cathodic outlet manifold 14. The two-phase flow of hydrogen and water flows out of the cell stack 12 through the cathodic outlet manifold 14. Similarly, this particular stream within the cathodic outlet manifold 14 may be configured to be transferred to a gas detection and conditioning system (separate from the anodic gas detection and conditioning system) for analysis of the composition within the stream. Specifically, this cathodic stream may be analyzed to identify if any undesirable oxygen gas has leaked (i.e., cross-leaked) across the membranes from the anode sides of the cells to the cathode sides of the cells within the cell stack.

Cross-Cell Leak Detection and Sample Conditioning System

Figure 2:
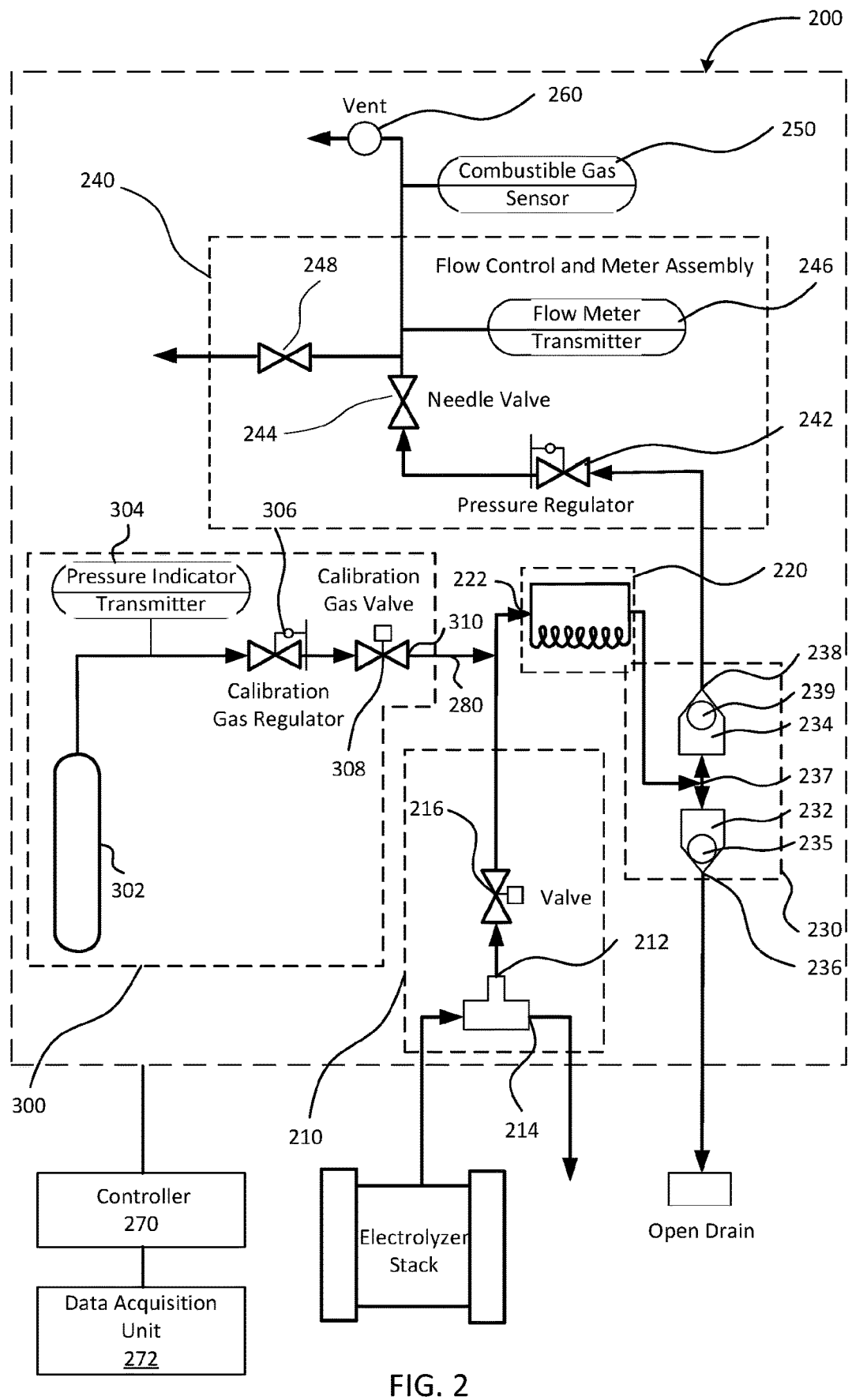
FIG. 2 depicts an embodiment of a gas detection and conditioning system.

FIG. 2 depicts an embodiment of a gas detection and conditioning system 200. In this depicted example of a gas detection and conditioning system, a fluid is received from an outlet of an electrochemical stack. As noted above, this may be a fluid or stream provided from the anodic outlet of the electrochemical stack. Alternatively, the fluid or stream may be provided from the cathodic outlet of the electrochemical stack.

The system 200 includes a separator 210, a heat exchanger 220, a trap system 230, a flow control and metering system 240, and a gas sensor 250 (e.g., combustible gas sensor). The system 200 may be configured to be arranged vertically such that any gas in the fluid may rise and flow through the system 200 and any liquid in the fluid may flow out of the system 200. For example, as depicted in FIG. 2, the separator 210 is positioned below the heat exchanger 220 and the trap system 230. The heat exchanger 220 and the trap system 230 may be positioned below the flow control and metering system 240 and gas sensor 250. Additionally, the vent 260 is positioned above the flow control and metering system 240 and gas sensor 250. This configuration advantageously separates the fluid into gas and liquid while allowing the gas to rise through the system and out of the vent 260. The liquid is advantageously drained out of the system due to gravity.

The separator 210 is configured to receive the fluid from an outlet (e.g., anodic or cathodic outlet) of an electrochemical stack. The separator 210 is configured to separate the fluid into a first stream that is primarily or a majority (e.g., at least 50%, at least 60%, at least 70%, at least 80%, at least 90%, at least 95%, or at least 99%) of a gas of the fluid and a second stream including the remaining components of the fluid. The first stream may represent a small sample or small percentage of the overall amount of the fluid exiting the electrochemical stack for further processing and analysis. In certain examples, the first stream may represent less than 10 vol %, less than 5 vol %, less than 1 vol %, less than 0.5 vol %, or less than 0.1 vol % of the overall volume of the outlet stream. An important or advantageous purpose of this initial separation is to draw off a sample that is primarily gas to process and eventually analyze the composition and identify if there are any undesired cross-leak within the electrochemical system prior to any catastrophic incident occurring (i.e., hydrogen in an oxygen sample on the anode side or oxygen in a hydrogen sample on the cathode side). A large scale separation between the majority of gas from the majority of liquid within the stream at this stage may is not necessarily desirable.

The first stream may be configured to flow out of an upper outlet 212 of the separator 210 and the second stream may be configured to drain out of a lower outlet 214 of the separator 210. The separator 210 may further include a first valve 216 configured to control the flow of the first stream exiting the upper outlet 212 of the separator 210 into the inlet 222 of the heat exchanger 220. As depicted in FIG. 2, the first valve 216 may be positioned downstream from the upper outlet 212 and upstream from a further component (e.g., heat exchanger 220) of the system. In some examples, the separator 210 may be a branch tee gas trap.

The heat exchanger 220 is configured to receive the first stream from the upper outlet 212 of the separator 210 and lower a temperature of the first stream to form a condensed liquid within the first stream via condensation. In other words, the heat exchanger 220 is advantageous in taking a primarily gas composition within first stream and assisting in the extraction of additional liquid from the composition through a reduction in temperature. As depicted in FIG. 2, the heat exchanger may include a plurality of coils configured to assist in reducing the temperature of the first stream as the stream passes through the coils and interacts with the ambient air surrounding the coils. In some alternative examples, a cooling fan or other cooling device may be positioned adjacent to the coils to assist in the reduction of temperature of the first stream as the stream passes through the coils.

Alternatively, other heat exchanger designs are possible. In one non-limiting example, the heat exchanger may include a double pipe or shell and tube heat exchanger with a coolant entering the exchanger at a lower temperature than the first stream and flowing parallel with the first stream or in a counterflow direction to assist in cooling the first stream. Further examples of heat exchangers known in the art are also possible.

As depicted in FIG. 2, a trap system 230 is configured to receive the first stream that has been cooled from the heat exchanger 220 and drain the condensed liquid out of a lower outlet 236 of the trap system 230. Furthermore, the trap system 230 is configured to transfer a remaining gas composition within the first stream out of an upper outlet 238 of the trap system 230.

In one example, as depicted in FIG. 2, the trap system 230 may include a float drain trap 232, a float vent trap 234, and a second passage 237. The second passage 237 is configured to provide fluid communication between the float drain trap 232 and the float vent trap 234. As depicted in FIG. 2, the float vent trap 234 is positioned above the float drain trap 232 such that the condensed liquid received from the heat exchanger 220 may accumulate in the float drain trap 232, and the gas composition within the first stream received from the heat exchanger 220 may transfer through the float vent trap 234 to the upper outlet 238 of the trap system 230 and into the flow control and metering system 240.

The float drain trap 232 is configured to drain the condensed liquid received from the heat exchanger 220 through the lower outlet 236 of the trap system 230. The float drain trap 232 has a float 235 that rises to unblock (i.e., open) the lower outlet 236 of the trap system 230 to drain the condensed liquid when the condensed liquid accumulates in the trap system 230.

The float vent trap 234 is configured to prevent any overflow of the condensed liquid received from the heat exchanger 220 from flowing into the flow control and metering system 240. The float vent trap 234 may have a float 239 that falls to unblock the upper outlet 238 of the trap system 230 when the accumulated condensed liquid is drained out of the lower outlet 236 of the trap system 230. Additionally, when the float 239 of the float vent trap 234 opens the upper outlet 238 of the trap system 230, the gas composition within the first stream is transferred out of the upper outlet 238 of the trap system 230.

Furthermore, as mentioned above, the system 200 includes a flow control and metering system 240. The flow control and metering system 240 is configured to receive the gas composition from the trap system 230. The flow control and metering system 240 is configured to condition the gas composition in the first stream and provide the conditioned gas composition in the first stream to the gas sensor 250 to be measured and analyzed. This process advantageously reduces the pressure of the sample gas composition prior to reaching the gas sensor 250 in order for the sample to be accurately analyzed for oxygen and/or hydrogen content in the sample.

The flow control and metering system 240 may include a pressure regulator 242, a needle valve 244, and a flow meter and transmitter 246. The pressure regulator 242 is configured to receive the gas composition from the trap system 230 and reduce a pressure of the gas composition of the first stream such that additional liquid may be formed and removed prior to analysis due to a pressure drop. The pressure regulator 242 may be configured or set to regulate the pressure to a gauge pressure within a range of 0.1-5 barG, 1-2 barG, or 1.5 barG, therein providing a conditioned gas. The additional liquid is removed from the first stream and drained from the system 200 due to the vertical configuration of the system 200 (e.g., the additional liquid drains out of the system through the trap system 230 due to gravity).

The needle valve 244 receives the conditioned gas (i.e., pressure regulated gas) in the first stream from the pressure regulator 242. The needle valve 244 is configured to control a flow rate of the conditioned gas in the first stream. The needle valve 244 is set to flow in a range of 0.1-10 liters per minute (L/min), 0.1-5 L/min, 0.5-5 L/min, 0.5 to 3.35 L/min, or 1-2 L/min. In certain examples, it may be desirable for the flow rate of the pressure regulated gas to be near 1.5 liters per minute. In other words, in certain examples, the gas composition within the flow control and metering system 240 of the gas detection and conditioning system 200 may be conditioned to have a desired pressure of 1.5 barG and a flow rate of 1.5 liters per minute.

In some examples, a vent valve 248 may be present within the flow control and metering system 240. The vent valve 248 may be configured to vent off or release excess gas from the system. In certain examples, the vent valve 248 may be positioned downstream of the pressure regulator 242 and upstream of the flow meter 246. In one particular example, the vent valve 248 may be positioned between the needle valve 244 and the flow meter 246. In certain examples, the vent valve 248 may be configured to assist in providing the desirable flow rate of the pressure regulated gas to the sensor 250. For example, as noted above, the desirable flow rate to the flow meter 246 and the downstream sensor 250 may be in a range of 0.1-10 liters per minute (L/min), 0.1-5 L/min, 0.5-5 L/min, 0.5 to 3.35 L/min, or 1-2 L/min. As such, any excess gas flow outside of the desired range may be configured to be vented from the system via the vent valve 248 prior to reaching the sensor 250.

The flow meter and transmitter 246 may be configured to measure the flow of the conditioned gas before the conditioned gas is analyzed by the gas sensor 250. The flow meter and transmitter 246 may also be configured to provide a notification or warning to a controller of a computing system or data acquisition unit via connected network when the flow of the conditioned gas in the first stream is less than a low flow rate threshold or greater than a high flow rate threshold as defined within the system. This notification or warning may alert an operator or user of the system that there may be a fault within the system. For example, if the flow of the conditioned gas in the first stream is less than a low flow rate threshold of 1 L/min, 0.5 L/min, or 0.1 L/min, for example, the flow meter and transmitter 246 transmits a notification or warning (e.g., alerts through a noise, message, or the like) that the flow of the conditioned gas is too low and a possible fault may be in the system 200. Likewise, if the flow of the conditioned gas in the first stream is outside a high flow rate threshold of 2 L/min, 3 L/min, or 5 L/min, for example, the flow meter and transmitter 246 transmits a notification or warning (e.g., alerts through a noise, message, or the like) that the flow of the conditioned gas is too high and a possible fault may be in the system 200. In some examples, to the extent the flow of the conditioned gas to the flow meter 246 is too high, the controller may provide a signal or instruction to the vent valve 248, if present, to open to vent off excess gas.

Furthermore, as mentioned above, the system 200 includes a gas sensor 250. The gas sensor 250 is configured to measure (i.e., analyze) the conditioned gas in the first stream received from the flow control and metering system 240, e.g., as the conditioned gas is vented through a vent 260. Thus, the gas sensor 250 may be configured to measure a concentration of the gas prior to being vented. This is advantageous in identifying whether hydrogen gas has leaked into the anode side of the stack or oxygen gas has leaked into the cathode side of the stack. In other words, the gas sensor 250 may be configured to identify or monitor a flammability level of the gas composition (e.g., the percentage of the lower or upper flammability level of the conditioned gas having a proper flow rate within lower and upper limits at a proper temperature and low moisture conditions, for accurate/reliable readings. In certain examples, the gas sensor 250 may be configured to transmit the sensor readings in real-time to a controller of a computing system or data acquisition unit via connected network to provide an indication of the status and operation of the electrochemical stack. In some instances, the gas sensor 250 or the connected controller may be configured to provide a notification or warning if the concentration level of hydrogen in oxygen or oxygen in hydrogen, or flammability of the analyzed sample is outside a predefined threshold range, therein indicating a potential cross-leak within the operation of the electrochemical stack.

In another embodiment, the system 200 may further include a controller 270 and a data acquisition unit 272. The controller 270 is in communication with the flow control and metering system 240 and the gas sensor 250. The controller 270 may be configured to control the flow control and metering system 240 to condition the gas in the first stream received from the trap system 230 such that the conditioned gas in the first stream is acceptable to be measured. The controller 270 may also be configured to control the gas sensor 250 to measure the conditioned gas in the first stream received from the flow control and metering system 240 as the conditioned gas is vented through the vent 260. The data acquisition unit 272 is configured to be in communication with the flow control and metering system 240 and the gas sensor 250. The data acquisition unit 272 is operable to measure, monitor, and/or receive system data in real-time. Furthermore, the controller 270 is configured to condition the gas in the first stream based on the system data measured, monitored, and/or received by the data acquisition unit 272.

In another embodiment, as depicted in FIG. 2, the system 200 may further include a calibration system 300. The calibration system 300 may be configured to flow a calibration gas having a known concentration of hydrogen in air or oxygen in nitrogen into the system 200 through a first passage 280 that is connected to the system 200 to check whether the system 200 is operating accurately. The calibration system 300 may be fluidly connected to system 200 by the first passage 280 that is fluidly connected upstream of the heat exchanger 220 and downstream of the first valve 216. Thus, the calibration gas may be prevented from flowing into the separator 210 and exiting the system 200 when the first valve 216 is closed.

The calibration system 300 may include a calibration cylinder 302 containing the calibration gas, and a pressure sensor or pressure indicator transmitter 304 configured to measure and transmit a pressure reading of the calibration gas. The calibration gas in the calibration cylinder 302 may be 2% hydrogen in air or 2% oxygen in nitrogen, for example. However, the calibration gas in the calibration cylinder may be any gas needed for calibration and is not limited to the specific calibration gas examples disclosed herein. The calibration system 300 may further include a calibration gas regulator 306 configured to regulate the pressure of the calibration gas, and a calibration gas valve 308 configured to control a flow of the calibration gas exiting an outlet 310 of the calibration system 300. The calibration gas valve 308 is positioned in the first passage 280 such that the calibration gas valve 308 is positioned above (i.e., downstream from the first valve 216) and in parallel to the first valve 216. The calibration system advantageously checks whether the system 200 is operating properly. In certain examples, it may be advantageous to check/calibrate the system 200 by the calibration system 300 before every startup procedure of the electrochemical stack.

In another embodiment, the calibration system 300 may be in communication with the controller 270 and the data acquisition unit 272. In other words, the controller 270 is further configured to control the operation of the calibration system 300. The data acquisition unit 272 is operable to measure, monitor, and/or receive calibration system data in real-time. Furthermore, the controller 270 is configured to control the pressure and flow of calibration gas into the system 200 based on the calibration system data measured, monitored, and/or received by the data acquisition unit 272. It may be advantageous for the calibration system 300 to be in communication with the controller 270 and the data acquisition unit 272 to periodically and remotely check (e.g., calibrate) the system 200. In other words, the calibration gas is automatically transferred into the system 200 to flow over the gas sensor 250, thereby calibrating the gas sensor 250.

Figure 3:
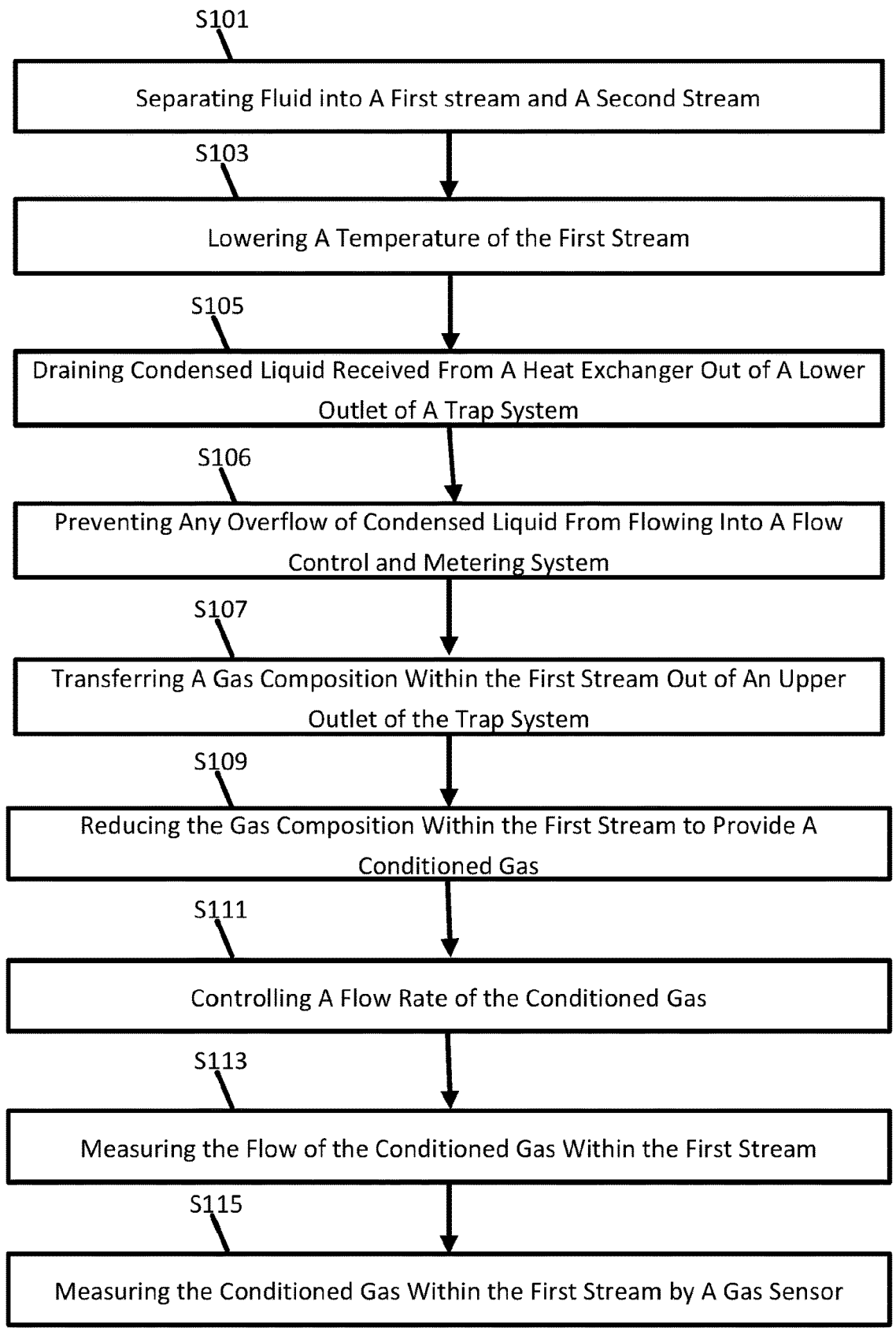
FIG. 3 depicts a flowchart describing a method for cross-cell leak detection and conditioning.

FIG. 3 depicts a flowchart describing a method for cross-cell leak detection and conditioning. In act S101, the separator 210 of the system 200 receives fluid from an outlet of an electrochemical stack (e.g., from the anodic outlet or from the cathodic outlet of the stack). The separator 210 separates the fluid into a first stream and a second stream. The first stream may represent a small sample of the overall outlet stream (e.g., less than 10 vol %, 5 vol %, 1 vol %, 0.5 vol %, or 0.1 vol % of the fluid in the outlet stream) and is mostly gas (e.g., greater than 50%, 60%, 70%, 80%, 90%, 95%, or 99% gas). The second stream of the fluid includes remaining composition of the fluid. The first stream is configured to flow out of the upper outlet 212 of the separator 210 into the heat exchanger 220 and the second stream is configured to drain out of the lower outlet 214 of the separator 210.

In act S103, a temperature of the first stream received from the separator 210 is lowered by the heat exchanger 220. The temperature of the first stream is lowered to form a condensed liquid within the first stream via condensation. In other words, the heat exchanger 220 of the system 200 lowers the temperature of the first stream to further remove liquid within the first stream.

In act S105, the first stream is received from the heat exchanger 220 into the trap system 230. The condensed liquid within the first stream is drained out of the lower outlet 236 of the trap system 230. Specifically, as the first stream is received from the heat exchanger 220, the condensed liquid within the first stream is drained out of the float drain trap 232, and the gas composition within the first stream is transferred through the float vent trap 234 to the upper outlet 238 of the trap system 230 and into the flow control and metering system 240. For instance, when the condensed liquid accumulates in the float drain trap 232, a float rises to open the lower outlet of the trap system 230 to drain the condensed liquid.

In act S106, any overflow of the condensed liquid received from the heat exchanger 220 is prevented from flowing into the flow control and metering system 240 when the condensed liquid accumulates in the trap system 230. In particular, the float vent trap 234, having the float 239, prevents the condensed liquid from transferring into the flow control and metering system 240 by having the float 239 block (i.e., close) the upper outlet 238 of the trap system 230.

In act S107, the gas composition within the first stream received from the heat exchanger 220 is transferred out of the upper outlet 238 of the trap system 230 when there is no accumulation of condensed liquid in the trap system 230. Specifically, the float 239 of the float vent trap 234 falls to unblock (i.e., open) the upper outlet 238 of the trap system 230.

In act S109, the flow control and metering system 240 conditions the gas composition within the first stream received from the trap system 230. The gas composition is first received by the pressure regulator 242, and the pressure regulator 242 reduces a pressure of the first stream such that additional liquid may be formed due to a pressure drop, therein providing a conditioned gas in the first stream. Specifically, in one example, the pressure regulator 242 may be set to regulate the pressure to 1.5 barG. As the pressure of the gas composition in the first stream is regulated, any additional liquid may be advantageously removed from the first stream and drained from the system 200 due to the vertical configuration of the system 200 (i.e., the additional liquid drains out of the system through the trap system 230 due to gravity).

In act S111, the needle valve 244 receives the pressure regulated gas in the first stream from the pressure regulator 242. In one example, the needle valve 244 may be configured to control a flow rate in a range of 0.5 to 3.35 liters per minute. In certain examples, it may be advantageous for the flow rate of the pressure regulated gas to be near 1.5 liters per minute for subsequent analysis of the gas sample. In other words, the needle valve sets the flow of the pressure regulated gas to be near 1.5 liters per minute such that the conditioned gas can be accurately measured by the sensor 250.

In act S113, the flow of the conditioned gas in the first stream is measured by the flow meter and transmitter 246 before the conditioned gas is analyzed by the gas sensor 250. An alert or warning may be triggered by the flow meter and transmitter 246 when the flow of the conditioned gas is either too low or too high, therein indicating a fault in the system 200. Therefore, the system 200 advantageously provides a level of security and safety during an electrolysis operation.

In act S115 the conditioned gas in the first stream received from the flow control and metering system 240 is measured by the gas sensor 250 as the conditioned gas is vented through a vent 260. Specifically, the concentration of the conditioned gas or the percentage of the lower or upper flammability level of the conditioned gas (i.e., the gas composition of the first stream having the proper flow, temperature, and low moisture conditions for accurate reliable readings) is measured by the gas sensor 250.

Figure 4:
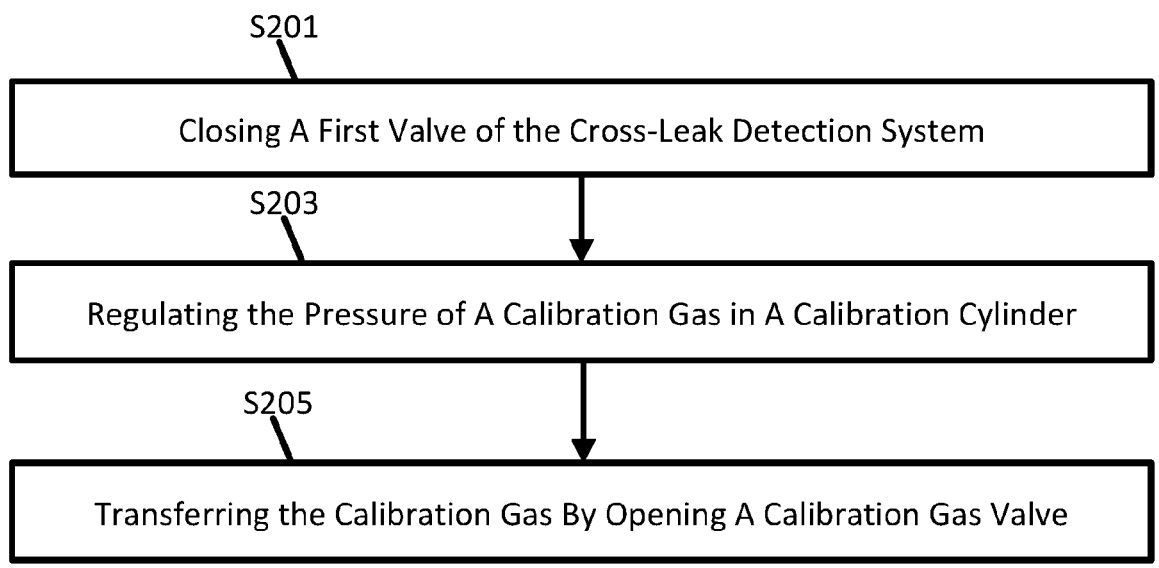
FIG. 4 depicts a flowchart describing a method for calibrating a gas detection and conditioning system.

In another embodiment, a method for cross-cell leak detection and conditioning may include or additionally include calibrating the system 200. FIG. 4 depicts a flowchart describing the method for calibrating the system 200 by the calibration system 300 before any electrolysis operation.

In act S201, the first valve of the system 200 is closed to prevent any fluid communication between the calibration system 300 and the separator 210. Thus, the flow of the calibration gas from the calibration system 300 can only enter the system 200 through the heat exchanger 220 and exit only through the vent 260 without any calibration gas exiting through the separator 210.

In act S203, the calibration gas in the calibration cylinder 302 is regulated by the calibration gas regulator 306 to be at a similar pressure as the system 200. Therefore, safe and accurate calibration of the sensor 250 is provided.

In act S205, the calibration gas is transferred from the calibration system through the first passage 280 into the inlet 222 of the heat exchanger 220 by opening the calibration gas valve 308. As mentioned above, the calibration system 300 advantageously checks whether the system 200 is operating properly and advantageously calibrates the sensor 250.

Figure 5:
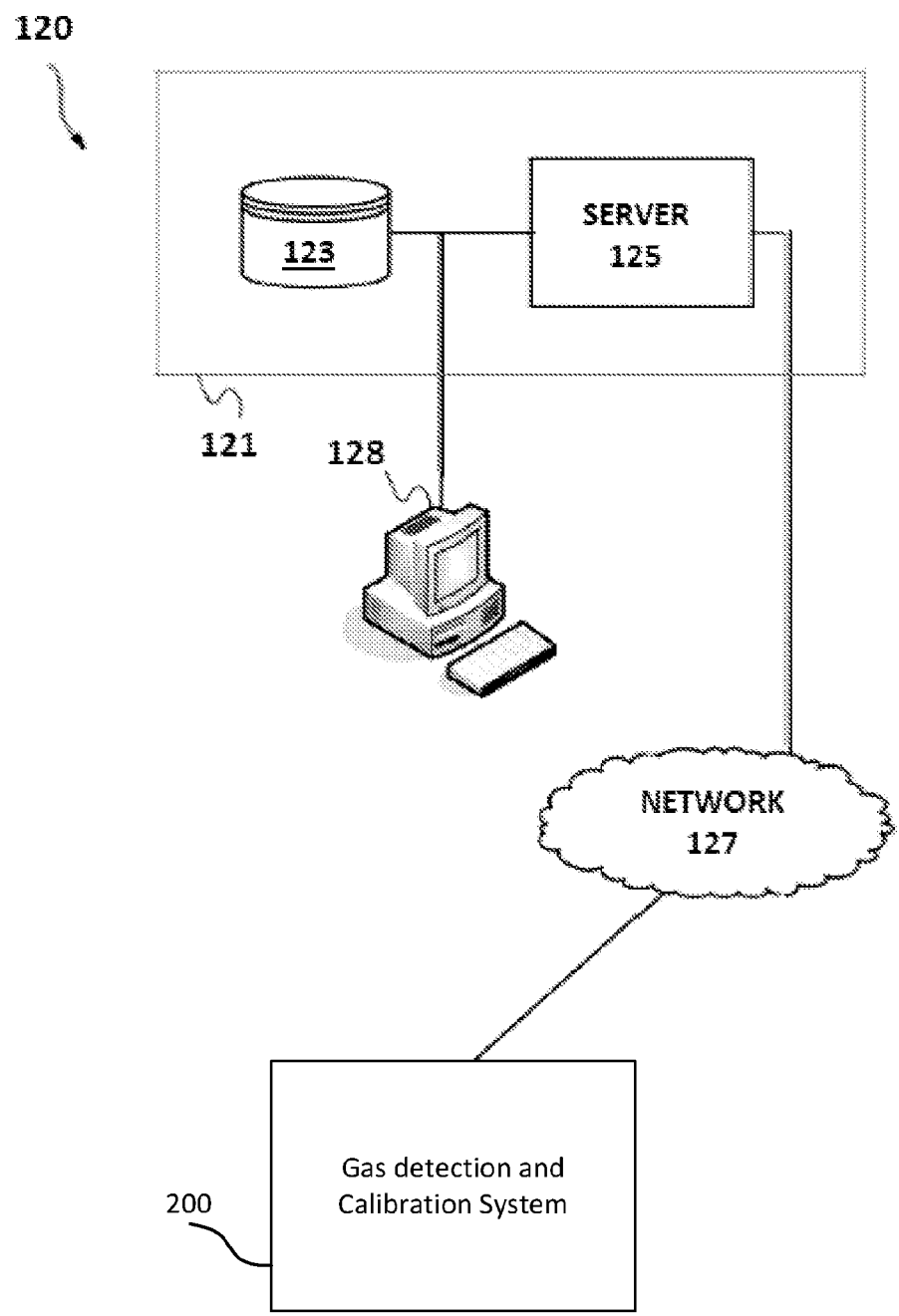
FIG. 5 illustrates an exemplary system for controlling an operation of a gas detection and conditioning system.

FIG. 5 illustrates an exemplary system 120 for controlling operation of a gas detection and conditioning system 200 (e.g., including a calibration system 300). The system 120 includes the gas detection and conditioning system 200 as described above, a monitoring system (e.g., including a data acquisition unit) 121, a workstation 128, and a network 127.

The monitoring system 121 includes a server 125 and a database 123. The monitoring system 121 may include computer systems and networks of a system operator (e.g., the operator of the system 200). The server database 123 may be configured to store information regarding the operating conditions or setpoints for optimizing the performance of the system 200.

The monitoring system 121, the workstation 128, and the gas detection and conditioning system 200 are coupled with the network 127. The phrase "coupled with" is defined to mean directly connected to or indirectly connected through one or more intermediate components. Such intermediate components may include hardware and/or software-based components. As such, any data collection via flow meters or sensors within the gas detection and conditioning system 200 may be transmitted via the connected network to the monitoring system 121 or workstation 128 for analysis.

The optional workstation 128 may be a general-purpose computer including programming specialized for providing input to the server 125. For example, the workstation 128 may provide settings for the server 125. The workstation 128 may include at least a memory, a processor, and a communication interface.

Figure 6:
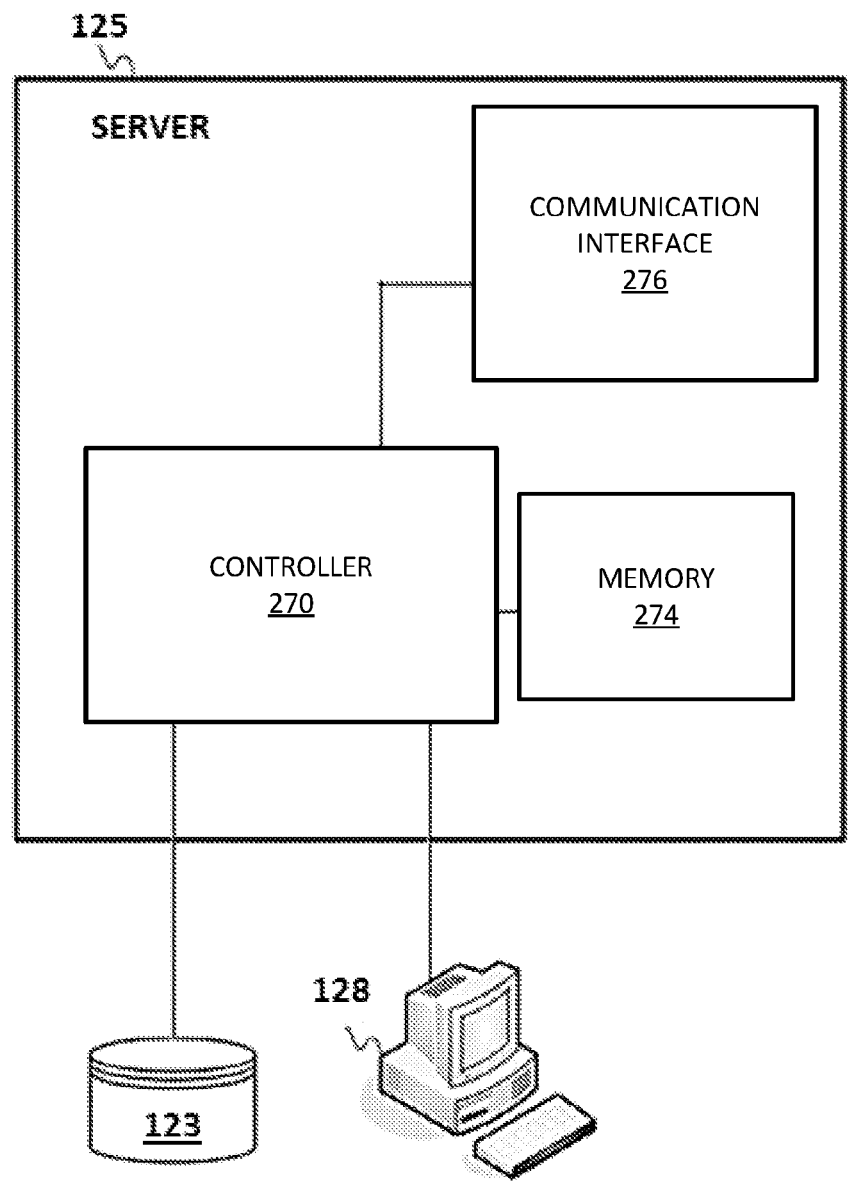
FIG. 6 depicts an example of a computing device having a controller.

FIG. 6 illustrates an exemplary server 125 of the system of FIG. 5. The server 125 includes a memory 274, a controller or processor 270, and a communication interface 276. The server 125 may be coupled to a database 123 and a workstation 128. The workstation 128 may be used as an input device for the server 125. The communication interface 276 receives data indicative of use inputs made via the workstation 128 or a separate electronic device.

The controller or processor 270 may include a general processor, digital signal processor, an application specific integrated circuit (ASIC), field programmable gate array (FPGA), analog circuit, digital circuit, combinations thereof, or other now known or later developed processor. The controller or processor 270 may be a single device or combination of devices, such as associated with a network, distributed processing, or cloud computing.

The controller or processor 270 may also be configured to cause the system 200 to: (1) open/close a plurality of valves (e.g., the first valve 216, the calibration gas valve 308, the needle valve 244, and the like); (2) regulate the pressure by a plurality of pressure regulators (e.g., the calibration gas regulator 306, the pressure regulator 242, and the like); and/or (3) measure the pressure, flow rate, and/or flammability level of either the first stream or second stream by the plurality of sensors (e.g., the pressure indicator transmitter 304, the flow meter and transmitter 246, the gas sensor 250, and the like) based on the data measured, monitored, and/or received by the data acquisition unit 272.

The memory 274 may be a volatile memory or a non-volatile memory. The memory 274 may include one or more of a read-only memory (ROM), random access memory (RAM), a flash memory, an electronic erasable program read-only memory (EEPROM), or other type of memory. The memory 274 may be removable from the device 122, such as a secure digital (SD) memory card.

The communication interface 276 may include any operable connection. An operable connection may be one in which signals, physical communications, and/or logical communications may be sent and/or received. An operable connection may include a physical interface, an electrical interface, and/or a data interface. The communication interface 276 provides for wireless and/or wired communications in any now known or later developed format.

In the above-described examples, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting example, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement one or more of the methods described herein. Applications that may include the apparatus and systems of various examples can broadly include a variety of electronic and computer systems. One or more examples described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in particular embodiments with reference to particular standards and protocols, the claim scope is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any digital computer. A processor may receive instructions and data from a read only memory or a random-access memory or both. The essential elements of a computer are a processor for performing instructions and one or more memory devices for storing instructions and data. The computer may also include or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube), LCD (liquid crystal display), or LED (light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server may be remote from each other and typically interact through a communication network. The relationship of client and server arises by virtue of computer programs running on the respective computers and having a client-server relationship with each other.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

As used herein, the singular forms "a," "an," and "the" include plural referents unless the context clearly dictates otherwise.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the disclosure. The claims should not be read as limited to the described order or elements unless stated to that effect. Therefore, all embodiments that come within the scope and spirit of the following claims and equivalents thereto are claimed as the disclosure.

The invention claimed is:

1. A gas detection and conditioning system comprising:
   a separator configured to receive a fluid from an outlet of an electrochemical stack, wherein the separator is configured to separate the fluid into a first stream comprising a majority of a gas of the fluid and a second stream comprising a remaining composition of the fluid, wherein the first stream is configured to flow out of an upper outlet of the separator and the second stream is configured to drain out of a lower outlet of the separator;
   a heat exchanger configured to receive the first stream from the upper outlet of the separator and lower a temperature of the first stream to form a condensed liquid within the first stream via condensation;
   a trap system configured to receive the first stream from the heat exchanger, wherein the trap system is configured to drain the condensed liquid out of a lower outlet of the trap system and transfer a gas composition within the first stream out of an upper outlet of the trap system;
   a flow control and metering system configured to receive the first stream comprising the gas composition from the trap system, wherein the flow control and metering system comprises a pressure regulator configured to reduce a pressure of the first stream such that additional liquid is formed and removed from the first stream due to a pressure drop, therein providing a conditioned gas in the first stream;
   a gas sensor configured to measure the conditioned gas in the first stream received from the flow control and metering system as the conditioned gas is vented through a vent;
   a controller in communication with the flow control and metering system and the gas sensor, wherein the controller is configured to control the flow control and metering system to condition the gas in the first stream received from the trap system, and control the gas sensor to measure the conditioned gas in the first stream received from the flow control and metering system as the conditioned gas is vented through the vent; and
   a data acquisition unit in communication with the flow control and metering system and the gas sensor, wherein the data acquisition unit is configured to measure, monitor, and/or receive system data in real-time, wherein the controller is configured to condition the gas in the first stream based on the system data measured, monitored, and/or received by the data acquisition unit.

2. The gas detection and conditioning system of claim 1, wherein the separator is a branch tee gas trap.

3. The gas detection and conditioning system of claim 1, further comprising:
   a first valve positioned between the separator and the heat exchanger,
   wherein the first valve is configured to control a flow rate of the first stream exiting the upper outlet of the separator into an inlet of the heat exchanger.

4. A gas detection and conditioning system comprising:
   a separator configured to receive a fluid from an outlet of an electrochemical stack, wherein the separator is configured to separate the fluid into a first stream comprising a majority of a gas of the fluid and a second stream comprising a remaining composition of the fluid, wherein the first stream is configured to flow out of an upper outlet of the separator and the second stream is configured to drain out of a lower outlet of the separator;

a heat exchanger configured to receive the first stream from the upper outlet of the separator and lower a temperature of the first stream to form a condensed liquid within the first stream via condensation;

a trap system configured to receive the first stream from the heat exchanger, wherein the trap system is configured to drain the condensed liquid out of a lower outlet of the trap system and transfer a gas composition within the first stream out of an upper outlet of the trap system;

a flow control and metering system configured to receive the first stream comprising the gas composition from the trap system, wherein the flow control and metering system comprises a pressure regulator configured to reduce a pressure of the first stream such that additional liquid is formed and removed from the first stream due to a pressure drop, therein providing a conditioned gas in the first stream; and a gas sensor configured to measure the conditioned gas in the first stream received from the flow control and metering system as the conditioned gas is vented through a vent, wherein the trap system further comprises:
　a float drain trap configured to drain the condensed liquid received from the heat exchanger through the lower outlet of the trap system, the float drain trap having a float configured to rise to open the lower outlet of the trap system to drain the condensed liquid when the condensed liquid accumulates in the trap system;
　a float vent trap configured to prevent any overflow of the condensed liquid received from the heat exchanger from flowing into the flow control and metering system, the float vent trap having a float that rises to block the upper outlet of the trap system when the condensed liquid accumulates in the trap system, and transfer the gas composition within the first stream out of the upper outlet of the trap system when the float of the float vent trap falls to open the upper outlet of the trap system; and
　a second passage configured to provide fluid communication between the float drain trap and the float vent trap,
　wherein the float vent trap is positioned above the float drain trap such that the gas composition within the first stream rises through the float vent trap to the upper outlet of the trap system when the float of the float vent trap falls to open the upper outlet of the trap system.

5. The gas detection and conditioning system of claim 1, wherein the flow control and metering system further comprises:
　a needle valve configured to control a flow rate of the conditioned gas in the first stream; and
　a flow meter and transmitter configured to measure the flow rate of the conditioned gas in the first stream before the conditioned gas is analyzed by the gas sensor and to provide a warning when the flow rate of the conditioned gas in the first stream is less than a low flow rate threshold or greater than a high flow rate threshold, therein indicating a fault in the gas detection and conditioning system.

6. A gas detection and conditioning system comprising:
　a separator configured to receive a fluid from an outlet of an electrochemical stack, wherein the separator is configured to separate the fluid into a first stream comprising a majority of a gas of the fluid and a second stream comprising a remaining composition of the fluid, wherein the first stream is configured to flow out of an upper outlet of the separator and the second stream is configured to drain out of a lower outlet of the separator;
　a heat exchanger configured to receive the first stream from the upper outlet of the separator and lower a temperature of the first stream to form a condensed liquid within the first stream via condensation;
　a first valve positioned between the separator and the heat exchanger, wherein the first valve is configured to control a flow rate of the first stream exiting the upper outlet of the separator into an inlet of the heat exchanger;
　a trap system configured to receive the first stream from the heat exchanger, wherein the trap system is configured to drain the condensed liquid out of a lower outlet of the trap system and transfer a gas composition within the first stream out of an upper outlet of the trap system;
　a flow control and metering system configured to receive the first stream comprising the gas composition from the trap system, wherein the flow control and metering system comprises a pressure regulator configured to reduce a pressure of the first stream such that additional liquid is formed and removed from the first stream due to a pressure drop, therein providing a conditioned gas in the first stream;
　a gas sensor configured to measure the conditioned gas in the first stream received from the flow control and metering system as the conditioned gas is vented through a vent; and
　a calibration system configured to provide a calibration gas into the gas detection and conditioning system through a first passage connected to the gas detection and conditioning system downstream of the first valve to calibrate the gas sensor, wherein the calibration gas is configured to be provided to the gas detection and conditioning system when the first valve is in a closed position to prevent any fluid communication between the calibration system and the separator.

7. The gas detection and conditioning system of claim 6, wherein the calibration system is fluidly connected to the gas detection and conditioning system downstream of the separator and upstream from the heat exchanger.

8. The gas detection and conditioning system of claim 6, wherein the calibration system comprises:
　a calibration cylinder containing the calibration gas;
　a pressure sensor configured to measure and transmit a pressure of the calibration gas;
　a calibration gas regulator configured to regulate the pressure of the calibration gas; and
　a calibration gas valve configured to control a flow of the calibration gas exiting an outlet of the calibration system.

9. The gas detection and conditioning system of claim 8, wherein the calibration gas in the calibration cylinder comprises a mixture of 2% hydrogen in air or 2% oxygen in nitrogen.

10. The gas detection and conditioning system of claim 1, wherein the controller is further configured to control operation of a calibration system, wherein the controller and the data acquisition unit are in communication with the calibration system, wherein the data acquisition unit is configured to measure, monitor and/or receive calibration system data in real-time, and wherein the controller is configured to control a pressure and flow of calibration gas into the gas detection and conditioning system based on the calibration system data measured, monitored, and/or received by the data acquisition unit.

11. The gas detection and conditioning system of claim 6, wherein the separator is a branch tee gas trap.

12. The gas detection and conditioning system of claim 6, wherein the trap system further comprises:
a float drain trap configured to drain the condensed liquid received from the heat exchanger through the lower outlet of the trap system, the float drain trap having a float configured to rise to open the lower outlet of the trap system to drain the condensed liquid when the condensed liquid accumulates in the trap system;
a float vent trap configured to prevent any overflow of the condensed liquid received from the heat exchanger from flowing into the flow control and metering system, the float vent trap having a float that rises to block the upper outlet of the trap system when the condensed liquid accumulates in the trap system, and transfer the gas composition within the first stream out of the upper outlet of the trap system when the float of the float vent trap falls to open the upper outlet of the trap system; and
a second passage configured to provide fluid communication between the float drain trap and the float vent trap,
wherein the float vent trap is positioned above the float drain trap such that the gas composition within the first stream rises through the float vent trap to the upper outlet of the trap system when the float of the float vent trap falls to open the upper outlet of the trap system.

13. The gas detection and conditioning system of claim 6, wherein the flow control and metering system further comprises:
a needle valve configured to control a flow rate of the conditioned gas in the first stream; and
a flow meter and transmitter configured to measure the flow rate of the conditioned gas in the first stream before the conditioned gas is analyzed by the gas sensor and to provide a warning when the flow rate of the conditioned gas in the first stream is less than a low flow rate threshold or greater than a high flow rate threshold, therein indicating a fault in the gas detection and conditioning system.

14. The gas detection and conditioning system of claim 6, further comprising:
a controller in communication with the flow control and metering system and the gas sensor, wherein the controller is configured to control the flow control and metering system to condition the gas in the first stream received from the trap system, and control the gas sensor to measure the conditioned gas in the first stream received from the flow control and metering system as the conditioned gas is vented through the vent; and
a data acquisition unit in communication with the flow control and metering system and the gas sensor, wherein the data acquisition unit is configured to measure, monitor, and/or receive system data in real-time,
wherein the controller is configured to condition the gas in the first stream based on the system data measured, monitored, and/or received by the data acquisition unit.

15. The gas detection and conditioning system of claim 14, wherein the controller is further configured to control operation of the calibration system,
wherein the controller and the data acquisition unit are in communication with the calibration system,
wherein the data acquisition unit is configured to measure, monitor and/or receive calibration system data in real-time, and
wherein the controller is configured to control a pressure and flow of the calibration gas into the gas detection and conditioning system based on the calibration system data measured, monitored, and/or received by the data acquisition unit.

16. The gas detection and conditioning system of claim 1, wherein the trap system further comprises:
a float drain trap configured to drain the condensed liquid received from the heat exchanger through the lower outlet of the trap system, the float drain trap having a float configured to rise to open the lower outlet of the trap system to drain the condensed liquid when the condensed liquid accumulates in the trap system;
a float vent trap configured to prevent any overflow of the condensed liquid received from the heat exchanger from flowing into the flow control and metering system, the float vent trap having a float that rises to block the upper outlet of the trap system when the condensed liquid accumulates in the trap system, and transfer the gas composition within the first stream out of the upper outlet of the trap system when the float of the float vent trap falls to open the upper outlet of the trap system; and
a second passage configured to provide fluid communication between the float drain trap and the float vent trap,
wherein the float vent trap is positioned above the float drain trap such that the gas composition within the first stream rises through the float vent trap to the upper outlet of the trap system when the float of the float vent trap falls to open the upper outlet of the trap system.

17. The gas detection and conditioning system of claim 1, further comprising:
a calibration system configured to provide a calibration gas into the gas detection and conditioning system through a first passage connected to the gas detection and conditioning system to calibrate the gas sensor.

18. The gas detection and conditioning system of claim 17, wherein the calibration system is fluidly connected to the gas detection and conditioning system downstream of the separator and upstream from the heat exchanger.

19. The gas detection and conditioning system of claim 17, wherein the calibration system comprises:
a calibration cylinder containing the calibration gas;
a pressure sensor configured to measure and transmit a pressure of the calibration gas;
a calibration gas regulator configured to regulate the pressure of the calibration gas; and
a calibration gas valve configured to control a flow of the calibration gas exiting an outlet of the calibration system.

20. The gas detection and conditioning system of claim 19, wherein the calibration gas in the calibration cylinder comprises a mixture of 2% hydrogen in air or 2% oxygen in nitrogen.

* * * * *